(12) United States Patent
Markley

(10) Patent No.: US 8,301,716 B2
(45) Date of Patent: Oct. 30, 2012

(54) INTERFACE FOR A MULTI-PROCESSOR GATEWAY APPARATUS AND METHOD FOR USING THE SAME

(75) Inventor: Jeffrey Paul Markley, Superior, CO (US)

(73) Assignee: Time Warner Cable Inc., New York, NY (US)

( * ) Notice: Subject to any disclaimer, the term of this patent is extended or adjusted under 35 U.S.C. 154(b) by 404 days.

(21) Appl. No.: 12/622,740

(22) Filed: Nov. 20, 2009

(65) Prior Publication Data

US 2011/0126133 A1    May 26, 2011

(51) Int. Cl.
*G06F 15/167*    (2006.01)

(52) U.S. Cl. ........ 709/214; 709/213; 709/215; 709/216; 711/129; 711/148; 725/90; 725/91; 725/92; 725/93; 725/94; 725/95; 725/96; 725/97

(58) Field of Classification Search .................. None
See application file for complete search history.

(56) References Cited

U.S. PATENT DOCUMENTS

| | | | |
|---|---|---|---|
| 6,567,083 B1 * | 5/2003 | Baum et al. ................. | 345/426 |
| 6,922,845 B2 * | 7/2005 | Yap et al. .................... | 725/141 |
| 7,035,906 B1 * | 4/2006 | Ellis, III .................... | 709/208 |
| 7,263,701 B2 * | 8/2007 | Yun ............................ | 719/313 |
| 7,574,696 B2 * | 8/2009 | Brassac et al. ............. | 717/127 |
| 2001/0052130 A1 * | 12/2001 | Yap et al. ..................... | 725/90 |
| 2002/0040475 A1 * | 4/2002 | Yap et al. .................... | 725/39 |
| 2003/0084144 A1 * | 5/2003 | Lipinski ...................... | 709/224 |
| 2003/0131135 A1 * | 7/2003 | Yun ............................ | 709/249 |
| 2004/0215931 A1 * | 10/2004 | Ellis ............................. | 712/36 |
| 2005/0231502 A1 * | 10/2005 | Harper et al. ................ | 345/418 |
| 2008/0005030 A1 * | 1/2008 | Schlarb et al. ............... | 705/57 |
| 2008/0022394 A1 * | 1/2008 | Park ............................. | 726/18 |
| 2009/0113173 A1 * | 4/2009 | Jaffrey ........................ | 712/32 |
| 2009/0204663 A1 * | 8/2009 | Patwari ....................... | 709/203 |
| 2011/0126133 A1 * | 5/2011 | Markley ....................... | 715/760 |

* cited by examiner

*Primary Examiner* — Backhean Tiv
(74) *Attorney, Agent, or Firm* — The Marbury Law Group, PLLC

(57) ABSTRACT

An interface for a multi-processor gateway apparatus and method for using the same. A user device communicates with a multi-processor gateway apparatus over a wired or wireless path. A first processor within the multi-processor gateway apparatus provides the user device a user interface. The user interface allows the user to select a function that is managed by one of the multiple processors. If the selected function is assigned to the first processor, the function is performed by the first. However, if the selected function is performed by one of the other processors, the first processor executes calls to an API layer associated with the processor assigned to perform the requested function. The requested function is performed by the processor to which it is assigned and the results reported to the first processor. The first processor then provides the results of the request to the user device via the path.

20 Claims, 2 Drawing Sheets

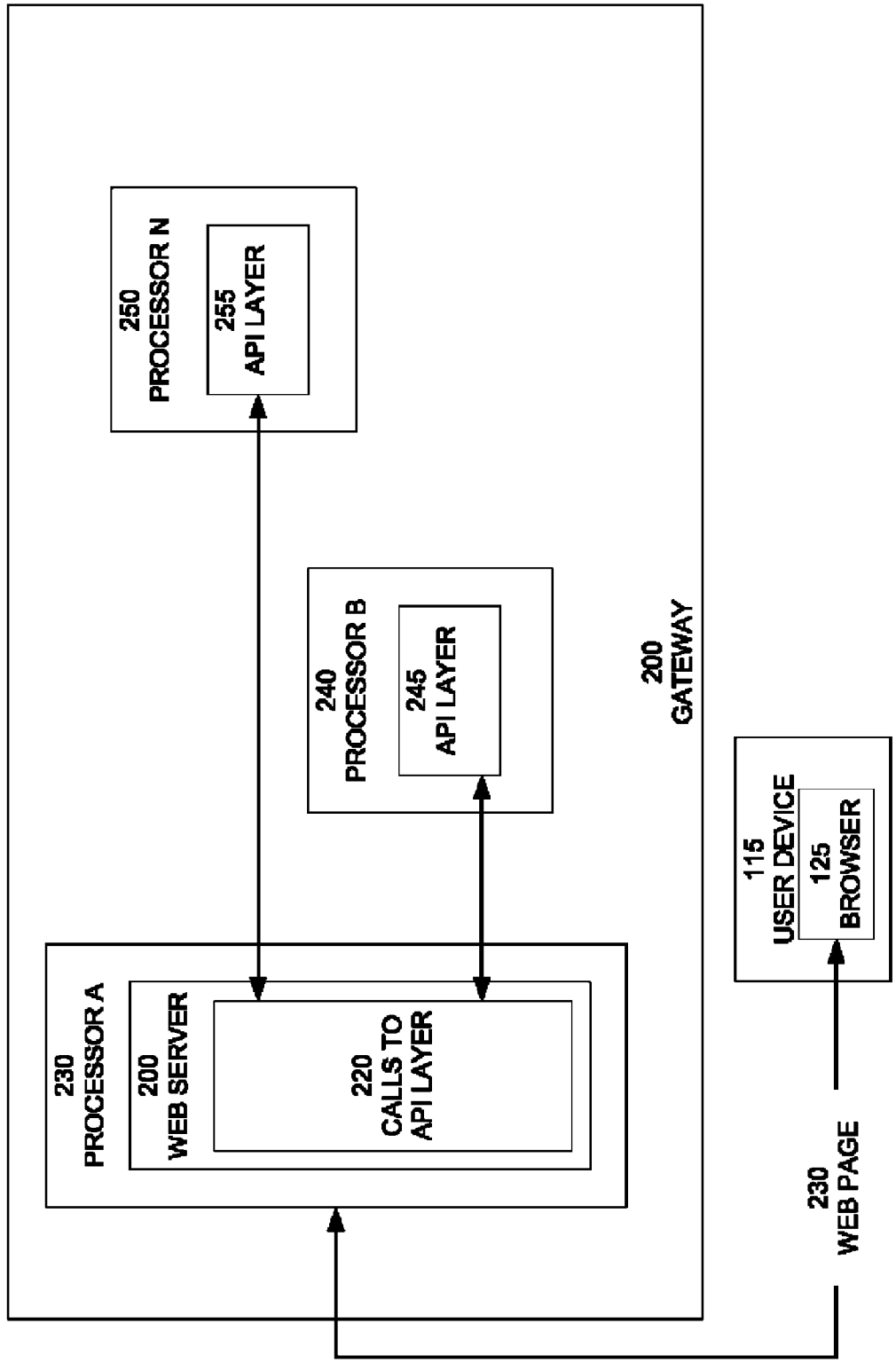

INTERFACE FOR A MULTI-PROCESSOR GATEWAY APPARATUS AND METHOD FOR USING THE SAME

BACKGROUND

Recent advances in digital information processing have made a whole range of services and functions available for delivery to consumers at their premises. These services and functions include digital programming (movies, etc.), digital video-on-demand (VOD), personal video recorder (PVR), Internet Protocol television (IPTV), digital media playback and recording, as well as high speed internet access and IP-based telephony (e.g., VoIP). Other services available to network users include access to and recording of digital music (e.g., MP3 files), as well as local area networking (including wire-line and wireless local area networks) for distributing these services throughout the user's premises, and beyond.

Currently, many of these services are provided and delivered to the user via a wide variety of different equipment environments including, inter alia, cable modems, Wi-Fi hubs, Ethernet hubs, gateways, switches and routers, computers, servers, cable set-top boxes, PSTNs, cellular telephones/smartphones, PDAs, and portable digital music devices such as the Apple iPod™. Additionally, the services associated with such technology are typically provided by multiple vendors including e.g., a cable service provider (e.g., MSO), cellular service provider, wireless service provider (WSP), VoIP service provider, music download service, Internet service provider (ISP), PSTN telephone service, etc.

A typical local area network (LAN) allows a user to connect a variety of devices to a single internet connection and to provide connectivity over the LAN between devices, e.g., a printer shared by several computing devices. The number of devices that are able to connect to a LAN is increasing. For example, security system devices can be connected to the LAN and controlled both locally via the LAN and remotely via an internet connection. From a technical perspective, any device can be made network connectable.

The myriad of services, equipment and providers can easily create confusion and economic inefficiency for someone using many of these services on a regular basis. In particular, a user may have to pay for each service or equipment separately, thus eliminating any economies of scale based on integration. Additionally, the equipment or services may not interoperate with one another, thus reducing the overall utility provided to the user, and increasing user frustration. These problems are particularly acute when the number of different services utilized (and hence number of service providers) is high. The user must also typically learn and recall a number of different user interfaces on a regular basis. For example, a cable TV electronic program guide (EPG) or navigator will use different menus and features than an EPG on a PDA, which will be different than an EPG on a PC, which will be different than those on their telephony system, and so forth.

Additionally, the lack of a common interface poses significant challenges to service providers providing maintenance and updating services. Because today's customer premises equipment cannot communicate through a common interface, service providers have only limited capabilities to perform remote configuration, provisioning, monitoring, and troubleshooting of such equipment.

Some improvements in digital service integration have been made over time. For example, cable system subscribers can now access VOD, PVR, PPV and broadcast services simultaneously, access the Internet via a cable modem, and send and receive telephone communications digitally (e.g., VoIP). However, these functions are still substantially disparate in terms of their hardware and software environments (i.e., the user must have a cable modem, set-top box, VoIP telephony unit, PC, etc.), and "cross-over" between the environments (e.g., moving content or data from one environment to the other) is quite limited.

Furthermore, conditional access (CA) paradigms currently in use are quite restricted, and not generally extensible beyond the user's set-top box. So, for example, the user would be prohibited from transferring streamed or downloaded content to their Wi-Fi enabled laptop or PC, since compatible conditional access support does not exist in these devices.

One approach for distributing digital services to and within a user premises is described in commonly owned U.S. patent application Ser. No. 11/378,129 entitled "Methods and Apparatus for Centralized Content and Data Delivery" filed Mar. 16, 2006, which application is incorporated herein by references for all purposes. A remotely manageable premises device acts as a centralized client networking platform providing gateway services as well as traditional content and high-speed data delivery functions. The device also acts as the shared Internet connection for all devices in the premises via a cable modem or other such interface, facilitates sharing personal and DVR content such as video, music and photos (and any associated metadata) throughout the premises, and provides both a wired and wireless network in the home. Telephony services utilizing embedded multimedia terminal adapter (eMTA) and/or Wi-Fi architectures may also be provided via the device.

The home media server/residential gateway apparatus (sometimes referred to herein as a "gateway") may also provide a trusted domain for content or data, as well as allowing a subscriber total mobility in the home by not limiting content or data to any one viewing/access location. For example, content or data may be accessed on any monitor in the premises, as well as on a PC or personal media device. Such a home media server/residential gateway device provides a converged services platform that provides a subscriber a single platform from which to receive and manage one or more services through one or more devices.

A gateway may also provide the ability to configure the devices of a subscriber premises media system from a single interface. For example, the gateway may include a high speed data and video programming component for receiving data from external sources and wireless components for establishing a wireless network within the subscriber's premises. The gateway may employ multiple processors to provide services to the subscriber. The subscriber typically interacts with the gateway through a user interface that utilizes a common set of instructions that is run by each of the processors in the gateway and that includes links to the other processors. By way of illustration and not by way of limitation, the common set of software instructions may be an HMTL-based Web page that displays a GUI on a browser. When a subscriber operating the browser selects a particular function for the gateway to perform, the selection directs the browser to the processor tasked with the selected function. Because each processor executes the common instructions, as the number of processors increases, so does the complexity of the linkage among the various processors.

FIG. 1 illustrates an architecture of a gateway operating two processors. In this architecture, processor A 130 operates a web server A 125 that executes common software instructions to produce a Web page 128 that is served to browser 125 operating on user device 115. Processor B 165 operates a web server B 160 that executes common software instructions to produce a Web page 163 that is served to browser 125. For example, a subscriber accesses web page A 128 associated through browser 125 to select a function that is managed by either processor A 130 or processor B 165. If the selected function is assigned to processor A 130, the function is performed by processor A 130. However, if the selected function is performed by processor B 165, the Web server A 125 executes link 135 to redirect browser 125 to web server B 160 and the function is performed by processor B 165. By way of illustration, the management operation may be identifying a destination for saving multimedia files uploaded by the subscriber from a computer via a wireless network or may be the configuration of an access point that is part of wireless network.

While FIG. 1 illustrates the use of a Web server, Web page and browser to provide an interface to a user, these elements are illustrative only and are not intended to be limiting. The operations described herein are equally applicable to other interface architectures that provide communications between the gateway 200 and a user of that gateway.

While FIG. 1 illustrates two processors, the gateway may utilize any number of processors. Each of these processors will operate a web server that executes the common software instructions to produce a Web page that is served to browser 125. Any change to the common software instructions, even a change that is particular to a single processor, requires that the common software instructions be changed in each of the web servers associated with each of the processors and that all of the functionality be tested prior to commercial release of the common software instructions.

SUMMARY

Embodiments herein are directed to a user interface for use with a multi-processor gateway.

In an embodiment, a user device communicates with a multi-processor gateway apparatus over a wired or wireless path. A first processor within the multi-processor gateway apparatus provides the user device a user interface. The user interface allows the user to select a function that is managed by one of the multiple processors. If the selected function is assigned to the first processor, the function is performed by the first. However, if the selected function is performed by one of the other processors, the first processor executes calls to an API layer associated with the processor assigned to perform the requested function. The requested function is performed by the processor to which it is assigned and the results reported to the first processor. The first processor then provides the results of the request to the user device via the path.

DESCRIPTION OF THE DRAWINGS

FIG. 2 is a block diagram illustrating a user interface according to an embodiment hereof.

DETAILED DESCRIPTION

Figure 1:
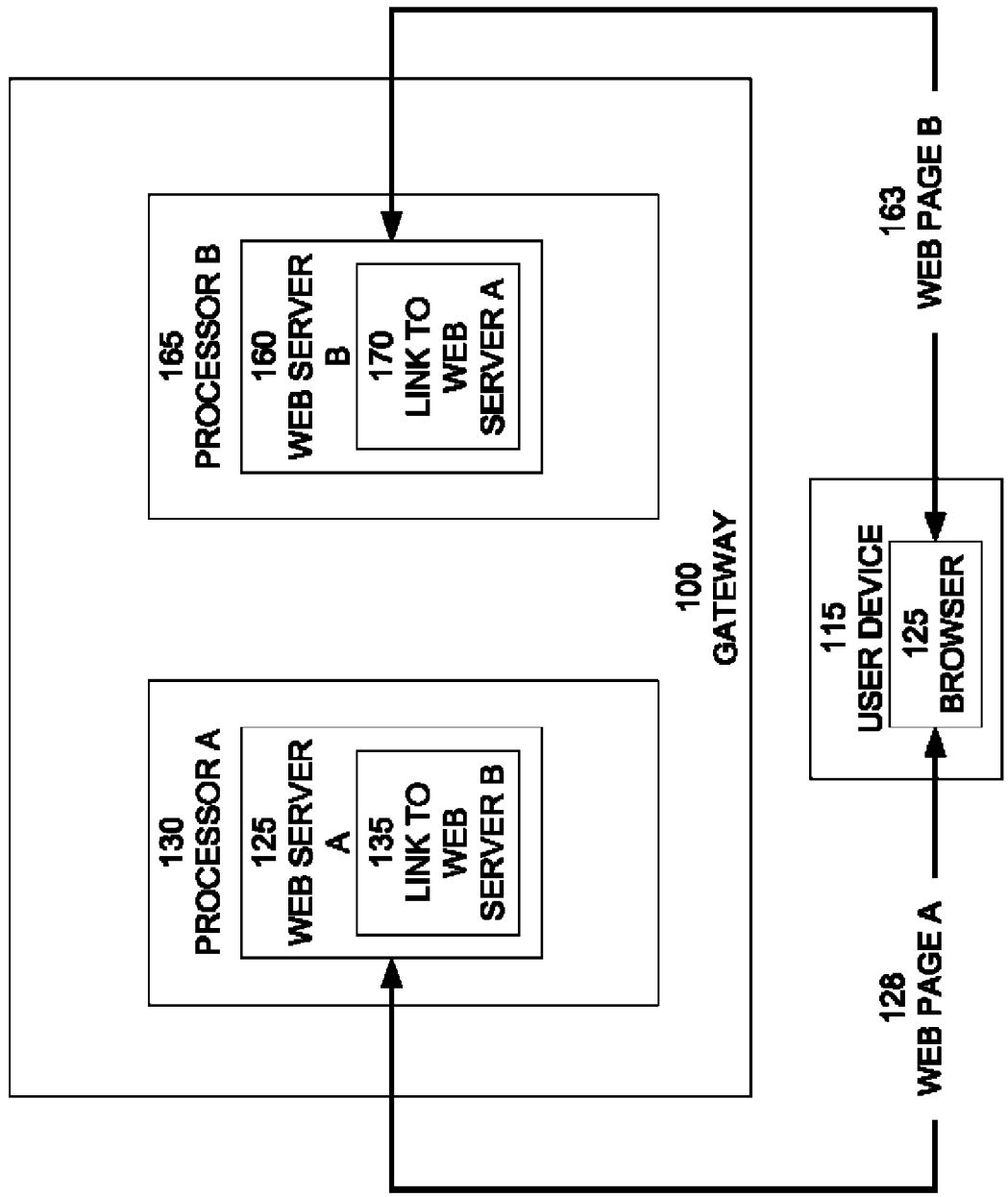
FIG. 1 is a block diagram illustrating a user interface known in the art.

As used herein the term "browser" refers to any computer program, application or module which provides network access capability including, without limitation, Internet browsers adapted for accessing one or more websites or URLs over the Internet, as well as any "user agent" including those adapted for visual, aural, or tactile communications.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the terms "Internet" and "internet" are used interchangeably to refer to inter-networks including, without limitation, the Internet.

As used herein, the term "IPC" or interprocess communication is a query that enables one application to control another application, and for several applications to share the same data without interfering with one another.

As used herein, the term "user interface" refers to, without limitation, any visual, graphical, tactile, audible, sensory, or other means of providing information to and/or receiving information from a user or other entity.

As used herein, the processor encompasses all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components. Additionally, the term processor encompasses logical processors that are implemented on a single physical processor.

FIG. 2 illustrates a user interface according to an embodiment hereof.

In this architecture, gateway 200 comprises processor A 230, processor B 240 and processor N 250. The processor A 230 operates a web server 200 that executes software instructions to produce a Web page 230 that is served to browser 125 operating on user device 115. By way of illustration and not by way of limitation, the user device may be a desk top computer, a laptop computer, a PDA, a set-top box, or a smart phone. The user device may communicate with gateway 200 via a wired or wireless path. The web server 200 also executes software instructions to produce calls to an API layer 245 of the processor B 240 and an API layer 255 of the processor N 250.

While FIG. 2 illustrates the use of a Web server, Web page and browser to provide an interface to a user, these elements are illustrative only and are not intended to be limiting. The operations described herein are equally applicable to other interface architectures that provide communications between the gateway 200 and a user of that gateway.

A subscriber accesses the web page A 230 through browser 125 to select a function that is managed by and one of the processors A 230, B 240 and N 250. If the selected function is assigned to the processor A 230, the function is performed by the processor A 230. However, if the selected function is performed by the processor N 250, the Web server A 200 executes calls to the API layer 255 associated with the processor N 250. The requested function is performed by processor N 250 and the results reported to Web server 200. Web server 200 then provides the results of the request to the subscriber in the web page 230 served to the browser 125.

A change in the user interface may require a change in the web page 230 served by web server 200 but will not require any changes to the API layers 245 or 255.

It will be understood by those skilled in the art that the present invention may be, without limitation, embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. An interface for a multi-processor gateway apparatus comprising:
    a first processor of the multi-processor gateway apparatus; and
    a second processor of the multi-processor gateway apparatus, wherein the second processor comprises an API layer,
    wherein the first processor is configured with executable software instructions that cause the first processor to perform operations comprising:
        serving a user interface to a user device connected to the multi-processor gateway apparatus via a path, wherein the user interface presents selectable functions to be performed by the multi-processor gateway apparatus;
        receiving an instruction from the user device to perform a selected function;
        determining whether the selected function is to be performed by the first processor or the second processor; and
        when the selected function is to be performed by the first processor:
            executing the instruction; and
            sending a result of the execution of the instruction by the first processor to the user device via the path;
        when the selected function is to be performed by the second processor:
            issuing an inter process communication call to the API layer of a second processor, wherein the second processor is configured with executable software instructions that cause the second processor to perform operations comprising executing the instruction;
            receiving from the API layer of the second processor a result of the execution of the instruction by the second processor; and
            sending the result of the execution of the instruction by the second processor to the first processor,
            wherein the first processor sends the results of the execution of the instruction by the second processor to the user device via the path.

2. The interface of claim 1, wherein the user device is selected from the group consisting of a desk top computer, a laptop computer, a PDA, a set-top box, and a smart phone.

3. The interface of claim 1, wherein the path is selected from the group consisting of a wired path and a wireless path.

4. The interface of claim 1, wherein the user device comprises a browser and wherein the software executable instruction for serving by the first processor a user interface to a user device comprises software executable instructions for:
    operating a web server;
    generating a web page; and
    sending the web page to the browser operated by the user device via the path.

5. The interface of claim 1, wherein the first and second processors are selected from the group consisting of a digital signal processor, a reduced instruction set processor, a general-purpose processor, a microprocessor, a gate array, a PLD, a reconfigurable computer fabric, an array processor, an application-specific integrated circuit (ASIC), and a logical processor.

6. The interface of claim 1, wherein the first and second processors are contained on a single unitary IC die.

7. The interface of claim 1, wherein the first and second processors are distributed across multiple components.

8. The interface of claim 1, wherein the multi-processor gateway apparatus is a content distribution apparatus.

9. The interface of claim 1, wherein the selected function is selected from the group consisting of configuring a router address, configuring an IP range, configuring a port identifier, configuring a filter identifier, configuring a voice system and sharing content on the user device with another user device connected to the multi-processor gateway apparatus.

10. The interface of claim 9, wherein the content is selected from the group consisting of a video file, an audio file, a text file, a document file, and an image file.

11. A method for interfacing to a multi-processor gateway apparatus comprising:
    serving a user interface to a user device from a first processor, wherein the user device is connected to the multi-processor gateway apparatus via a path and wherein the user interface presents selectable functions to be performed by the multi-processor gateway apparatus;
    receiving an instruction from the user device to perform a selected function;
    determining at the first processor whether the selected function is to be performed by the first processor or by a second processor of the multi-processor gateway apparatus, wherein the second processor comprises an API layer; and
    when the selected function is to be performed by the first processor:
        executing the instruction at the first processor; and
        sending a result of the execution of the instruction by the first processor to the user device via the path;
    when the selected function is to be performed by the second processor:
        issuing an inter process communication call from the first processor to the API layer of the second processor;
        executing the instruction at the second processor;
        receiving at the first processor a result from the API layer of the second processor;
        sending the result of the execution of the instruction by the second processor to the first processor; and
        sending by the first processor the results of the execution of the instruction by the second processor to the user device.

12. The method of claim 11, wherein the user device is selected from the group consisting of a desk top computer, a laptop computer, a PDA, a set-top box, and a smart phone.

13. The method of claim 11, wherein the path is selected from the group consisting of a wired path and a wireless path.

14. The method of claim 11, wherein the user device comprises a browser and wherein the method further comprises:
    operating by the first processor a web server;
    generating a web page; and
    sending the web page to the browser operated by the user device via the path.

15. The method of claim 11, wherein the first and second processors are selected from the group consisting of a digital signal processor, a reduced instruction set processor, a general-purpose processor, a microprocessor, a gate array, a PLD, a reconfigurable computer fabric, an array processor, an application-specific integrated circuit (ASIC), and a logical processor.

16. The method of claim 11, wherein the first and second processors are contained on a single unitary IC die.

17. The method of claim 11, wherein the first and second processors are distributed across multiple components.

18. The method of claim 11, wherein the multi-processor gateway apparatus is a content distribution apparatus.

19. The method of claim 11, wherein the selected function is selected from the group consisting of configuring a router address, configuring an IP range, configuring a port identifier, configuring a filter identifier, configuring a voice system and sharing content on the user device with another user device connected to the multi-processor gateway apparatus.

20. The method of claim 19, wherein the content is selected from the group consisting of a video file, an audio file, a text file, a document file, and an image file.

* * * * *